United States Patent [19]

Holcombe, Jr. et al.

[11] Patent Number: 4,810,300

[45] Date of Patent: Mar. 7, 1989

[54] BINDER/SUSPENSION COMPOSITION YIELDING WATER INSOLUBILITY ALONE OR WITH ADDITIVES

[75] Inventors: Cressie E. Holcombe, Jr., Knox County; Lloyd R. Chapman, Anderson County, both of Tenn.

[73] Assignee: ZYP Coatings, Inc., Oak Ridge, Tenn.

[21] Appl. No.: 189,352

[22] Filed: May 2, 1988

Related U.S. Application Data

[63] Continuation-in-part of Ser. No. 927,520, Nov. 6, 1986, Pat. No. 4,741,775.

[51] Int. Cl.$^4$ .................................................. C09D 1/00
[52] U.S. Cl. ..................... 106/086.1; 106/70; 106/23; 106/26; 106/287.34; 106/436; 106/482; 106/74
[58] Field of Search ............... 106/20, 23, 26, 430, 106/436, 482, 287.34, 286.1, 74

[56] References Cited

U.S. PATENT DOCUMENTS

| | | | |
|---|---|---|---|
| 2,668,149 | 2/1954 | Iier | 252/313.1 |
| 2,978,361 | 4/1961 | Seidl | 427/419.2 |
| 3,180,746 | 4/1965 | Patton et al. | 106/14.21 |
| 4,066,598 | 1/1978 | Deer et al. | 252/389.3 |
| 4,479,824 | 10/1984 | Schuff | 106/14.21 |

Primary Examiner—Prince E. Willis
Assistant Examiner—Willie J. Thompson
Attorney, Agent, or Firm—Pitts and Brittian

[57] ABSTRACT

A composition to produce an adherent and water insoluble deposit on substrate surfaces. A coating material for these surfaces is described which can be applied at any temperature up to at least 2,000 degrees Fahrenheit, with the resultant deposit (after drying) being highly adherent and water insoluble. This coating has a liquid phase formed from at least water, a pre-reacted lithium silicate, and unreacted lithium hydroxide monohydrate. Preferably, the liquid phase contains a dispersent in the form of a clay, for example. Typically the pre-reacted $Li_2O$-$SiO_2$ has a $SiO_2$:$Li_2O$ molar ratio of about 4.6:1, and the unreacted $LiOH.H_2O$ provides from $\frac{1}{8}$ to $\frac{2}{3}$ the total lithium oxide content, giving a final $SiO$:$Li_2O$ molar ratio of the composition of from about 1.71:1 to about 2.97:1. To this liquid phase is added a suitable pigment or other refractory material, at about 6–80 wt % based upon the liquid phase. A range of compositions is discussed as well as typical results. This includes graphite, oxides, borides, nitrides, carbides, sulfides, metals and mixtures thereof. The particular refractory material must be stable in the highly basic condition of the liquid phase.

14 Claims, No Drawings

BINDER/SUSPENSION COMPOSITION YIELDING WATER INSOLUBILITY ALONE OR WITH ADDITIVES

DESCRIPTION

The present application is a continuation-in-part application based upon parent application Ser. No. 927,520 filed Nov. 6, 1986, for which U.S. Pat. No. 4,741,775 will issue on May 3, 1988.

TECHNICAL FIELD

This invention relates to a binder/suspension liquid and to mixes based upon this liquid that yield water-insoluble compositions when dry. These compositions are useful for inks, paints, etc., which have high adherence from ambient temperatures ($-20$ to 100 degrees F.) to elevated temperatures (about 2000 degrees F.).

BACKGROUND ART

In the metallurgical art, for example, it is a common practice to mark metal ingots, sheets, etc., with a designation or code to identify the composition, heat treatment, customer, etc., of the particular piece. Also, certain portions of these objects are often marked in certain areas or sections to identify later cutting, heat treatment, etc. This marking often takes the form of thin lines or a bar code as applied by a computer-controlled jet printer. Such lines or codes are applied to both cold and hot metals, as well as clean-surfaced or oxidized-surface metals and are generally read with a scanner. Frequently, this marking is carried out while the substrate is at elevated temperatures. White pigmented inks are generally used for steels and dark inks are used for aluminum and other shiny metals. Similar inks are used for substrates other than metal, also.

Inks currently used in the art often contain organic solvents and additives. In addition to the production of volatiles of potential hazard, such solvents or additives char at elevated temperatures and thereby contribute to a reduction in "readability" of the code. Furthermore, many of the commercial inks have a limited solubility, and storage of marked metals in open yards where such are subjected to rain/snow leads to poor readability of the codes after relatively short storage.

Still another problem experienced in the art is the failure of inks that can be applied at high temperature when used near room temperature and vice versa. Thus, two separate types of inks have been used in the prior art: one for hot applications and one for cold or ambient temperature applications. Yet another problem with inks of the prior art is the settling out of pigments and other solid constituents giving rise to problems in the jets of the printers. Also, some constituents of low temperature inks are not compatible with those of the high temperature inks thereby necessitating care in cleaning the printer system before changing types of inks.

In addition to the marking with an ink, it is common practice in the metallurgical art to apply protective coatings to metals and ceramics to minimize corrosive action. This is usually accomplished with a paint-type coating.

Various lithium silicate compositions are known in the art as applied to coatings for metal, wood, cloth, etc. Some of these are used for sealing the surfaces of the respective "substrates", for reducing flammability and even for joining layers of the substrate. Typical of the art are the compositions described in U.S. Pat. Nos. 2,668,149, issued to R. K. Iler on Feb. 2, 1954; 2,978,361, issued to A. Seidl on Apr. 4, 1961; 3,130,061, issued to W. M. McMahon, et al., on Apr. 21, 1964; 3,180,746 and 3,180,747, issued to R. H. Patton, et al., on Apr. 27, 1985; 3,392,039, issued to F. L. Cuneo on July 9, 1968; 3,455,709, issued to G. W. Sears on July 15, 1967; and 3,565,575, issued to R. H. Sams on Feb. 23, 1971. None of these references discuss adherence at elevated temperature or their application to metals in all conditions of oxidation such as those experienced in the metallurgical processing art. Further, as set forth in the experimental evidence provided herein, several of the compositions did not provide an adherent coating when applied in strips as a bar code or when applied over a narrow or wide area. Some of the references do discuss the use of pigments (titanium dioxide, iron oxide, etc.), and the use of clays as "extenders" and as "binders". A study of these compositions revealed that none of the compositions were suitable to provide the numerous characteristics required for an ink or a coating for use over the wide range of temperature from room temperature to about 2,000 degrees F.

Accordingly, it is an object of the present invention to provide a binder/suspension composition that, when dry, results in a water insoluble marking/coating that can be applied to either cold or hot surfaces.

It is also an object of the present invention to provide a binder/suspension liquid to which can be added a wide range of materials for the preparation of inks, coatings, fillers, etc., which are water insoluble when dry and which then can withstand a wide range of temperatures.

It is a further object of the invention to provide a marking ink or coating which, when applied to metal or other surfaces, is water insoluble and adherent after drying.

It is a further object of the invention to provide a marking ink or coating that will withstand a re-heating to several hundred degrees.

It is another object of the present invention to provide an ink for marking or coating of metals and other substrates that can be applied to dry surfaces without further preconditioning of the surfaces.

It is still an additional object of the invention to provide an ink for use in jet printers to affix a bar code to metal components to identify alloy composition, heat treatment, customer, areas for later cutting, etc., with the ink suitable for application at temperatures ranging from room temperature to about 2,000 degrees Fahrenheit.

These and other objects of the present invention will become apparent upon a consideration of the full description given hereinafter.

DISCLOSURE OF THE INVENTION

According to the present invention, a binder/suspension composition is provided which is a reacted solution of colloidal silica and lithium hydroxide into which unreacted lithium hydroxide monohydrate powder is dissolved. More specifically, the composition contains from about ⅓ to ⅔ of the total $Li_2O$ content as commercial lithium silicate solution (silica gel reacted with LiOH), and about ⅓ to ⅔ of the total $Li_2O$ content as unreacted lithium hydroxide monohydrate. About 6–80 wt % of a suitable additive selected from the oxides (or mixed oxides) of the transition elements and other refractory materials compatible with extremely basic solutions can be added to form inks, coatings, fillers etc. The resultant composition can be applied to many substrate surfaces over a temperature range from room temperature to at least 2,000 degrees Fahrenheit and is insoluble in water after drying. Furthermore, no detrimental effects upon the marking/coating are noted upon reheat after application. In the preferred embodiment, the liquid composition comprises about 37 wt % water, 58.5% lithium silicate solution (4.6:1 molar ratios of $SiO_2:Li_2O$) having 75-80% water content, about 4 wt % $LiOH.H_2O$ and about 0.5 wt % suspension agent-binder. To this is added about 6-80% (based on liquid weight of a suitable additive for a selected application.

BEST MODE FOR CARRYING OUT THE INVENTION

Lithium silicate solutions are available from several commercial chemical companies. For example, the Lithium Company of America manufactures "Lithsil-4" having a $SiO_2:Li_2O$ mole ratio of 4.5 to 5.0; and, "Lithsil-6" having a $SiO_2:Li_2O$ mole ratio of 5.6 to 6.3. The Foote Mineral Company manufactures a lithium silicate solution having a $SiO_2:Li_2O$ mole ratio of 4.23. (These mole ratio values are taken from bulletins issued by these companies.) These commercial silicate solutions contain 75-80% water. Generally, the lithium silicate solutions are formed by reacting colloidal silica with lithium hydroxide (LiOH) at temperatures up to about 150 degrees Centigrade (see U.S. Pat. No. 3,180,747). Another method, giving rise to higher $SiO_2:Li_2O$ mole ratios (up to 25), is described in U.S. Pat. No. 2,668,149.

The lithium silicates described in the prior art are indicated as producing water insoluble coatings when applied on various materials. Accordingly, one of the commercial lithium silicate solutions (Lithsil-4) was tested as a "carrier" for a pigment in the preparation of an ink for the above-defined applications; i.e., jet-applied markings for metal ingots, etc. Thin lines, as well as wide areas, of a water solution of the Lithsil-4 were applied to a stainless steel spatula and allowed to dry. Thereafter, the adherence and water insolubility at room temperature were observed. As indicated in Table 1 very poor adherence was observed as the deposit was easily dusted off the spatula upon drying.

Studies were then conducted of an ink wherein lithium hydroxide monohydride was dissolved in the already reacted lithium silicate. Solutions were again prepared with the Lithsil-4 and water. These ink solutions (with some $TiO_2$ pigment) were applied in narrow strips and wide areas to the same type of stainless steel spatula. As reported in the further data of Table 1, whn about 1.08 wt % (wt % in the liquid phase) additional lithium hydroxide monohydrate ($LiOH.H_2O$) was added, reasonable adherence and water insolubility was achieved at room temperature. As noted, increased adherence and water insolubility was achieved with increased amounts of the monohydrate. Optimum performance was observed when about 4.2 wt % $LiOH.H_2O$ was added to the base ink solution. This ink is referred to hereinafter as the "standard ink". However, a range of 2.15 wt % (−50% with respect to the amount for the standard) to nearly 6.17 wt % (+50%) gave satisfactory adherence and water solubility at room temperature when further tests were conducted on different metals. At higher $LiOH.H_2O$ additions, the ink was readily soluble.

Having determined the characteristics of the ink at room temperatures, elevated temperature tests were conducted. The results are summarized in Table 2. Coupons of type 304L stainless steel were used as a representative high expansion material, and coupons of type 410 stainless steel were used as a representative of low expansion steels. Coupons of type 316 stainless steel were also tested. One, two and three coats of the ink were brushed on the coupons, with drying of each coat in air. The coupons of type 304L S.S. were heated in air over a period of 45 minutes to a temperature of 1832 degrees F. (1,000 degrees C.), followed by furnace cooling to 635 degrees C. and then evaluated. For the 410 SS, the coupons were flash heated (10 minutes) to a temperature of 1,100 degrees F. (593 degrees C.) and air quenched. The 316 SS coupons were heated using the same schedule as those of 304L SS. As noted in the data, a single coat of all tests compositions (−50% to +50%) had god adherence and most exhibited good adherence when at least two coats were applied. When used as an ink for jet marking, a thickness equivalent to about one coat is applied (typically 0.001 in.). Substantially the same results were obtained on deposits applied at or near room temperature, dried and then heated to elevated temperatures, thus corresponding to "reheat" conditions.

TABLE 1

| $LiOH.H_2O$ wt % | DESIGNATION | RESULTS ON STAINLESS STEEL |
|---|---|---|
| 4.20 | Std. Ink | Excellent adherence, water insolubility very good |
| 6.17 | +50% | Water insolubility barely acceptable |
| 7.13 | +75% | No water insolubility |
| 8.06 | +100% | Washed off easily |
| 2.15 | −50% | Water insolubility very good |
| 1.08 | −75% | Water insolubility good |
| 0.545 | −87.5% | Poor adherence, water insolubility fair |
| Zero | −100% | Very poor adherence, dusts off |

TABLE 2

| METAL | DESIGNATION | OBSERVATION |
|---|---|---|
| 304L | +50% | 1-2 coats good, edge flaking on 3rd coat |
|  | Std. Ink | 1-3 coats good |
|  | −50% | 1 coat good, cracking and flaking on 2-3rd coats |
| 410 | +50% | 1 coat good, cracking and flaking on 2-3rd coats |
|  | Std. Ink | 1-2 coats good, cracking and flaking on 3rd coat |
|  | −50% | 1-3 coats good |
| 316 | Std. Ink | 1-2 coats good, some flaking on 3rd coat |

The results of tests on the levels of pigment additives, and types of pigments, are summarized in Table 3. The standard ink with 15% $TiO_2$ (based on liquid weight) provides satisfactory color distinction on relatively dark backgrounds and, as shown in the Table, exhibits excellent adherence and water insolubility. (The "hiding power" of the $TiO_2$ at about 12% is minimal.) These data indicate that up to about 60% $TiO_2$ has little effect on the adherence and water insolubility of the deposit.

A satisfactory dark ink for use on shiny surfaces, for example, is prepared by adding a manganese oxide-iron oxide pigment. A typical composition is 88 wt % $MnO_2$ − 12 wt % $Fe_2O_3$. When up to 60% (based on wt of the liquid) of this pigment is added to the standard ink liquid, the ink exhibits good adherence and water insolubility. Other pigments formulated from oxides (typically silicates) of the transition metals also appear to perform about as well when used at up to 50-60%.

TABLE 3

| DESIGNATION | OBSERVATION |
| --- | --- |
| Std. Ink +15% TiO$_2$ | Excellent adherence, water insolubility very good |
| +60% TiO$_2$ | Water insolubility barely acceptable |
| +48.75% TiO$_2$ | Water insolubility about as good as standard |
| +37.5% TiO$_2$ | Water insolubility as good as standard |
| +50% MnO$_2$—Fe$_2$O$_3$ (88% MnO$_2$, 12% Fe$_2$O$_3$) | Water insolubility about as good as standard |

Referring now to Table 4, the standard ink has 31.5 mol % Li$_2$O and 68.5 mol % SiO$_2$ giving a molar ratio of SiO$_2$:Li$_2$O of 2.17. The +50% ink (50% increase of LiOH.H$_2$O over the standard) has a SiO$_2$:Li$_2$O molar ratio of 1.71, and the −50% ink has a molar ratio of 2.97. Commercial Lithsil-4 has a molar ratio of 4.6. The standard ink is made by dissolving in a commercial lithium silicate solution (pre-reacted SiO$_2$ and Li$_2$O) about ½ by weight of unreacted lithium hydroxide monohydrate (based upon the total Li$_2$O content). Stated in another way, about one-half of the Li$_2$O content of the standard ink is contained in the pre-reacted lithium silicate solution and about one-half of the Li$_2$O content results from the unreacted lithium hydroxide monohydrate. The −50% and +50% inks are made by adding about ⅓ and ⅔ unreacted LiOH.H$_2$O, respectively.

When pigments are added to form inks, these pigment solids are prone to settle. Although stirring equipment is often standard on jet ink sprayers, a reduced settling was investigated through the addition of suspension agents. Two types of suspension agents were tested relative to the lithium silicate standard ink: sodium carboxymethylcellulose (CMC) at 2 to 3% based on the water content of the ink liquid; and various bentonite and related clays at 0.5 to 5.4 wt %. Both types of suspension agents provided some improvement in the settling characteristics of the ink. They had no adverse affects upon adherence or water insolubility at these levels of addition. Highly beneficiated hectorite was about the best of the clay suspension agents tested.

TABLE 4

| DESIG-NATION | MOLAR RATIO Li$_2$O:SiO$_2$ | WT. FRACTION Li$_2$O:SiO$_2$ | M.P. (APPROX.) |
| --- | --- | --- | --- |
| Std. | 31.5%:68.5% | 18.7%:81.3% | 1032 C* |
| +50% | 36.9%:63.1% | 22.6%:77.4% | 1075 C |
| −50% | 25.2%:74.8% | 14.4%:85.6% | 1200 C* |
| Lithsil-4 | 17.5%:82.5% | 9.6%:90.4% | 1500 C* |

*Liquid starts about 1028 degrees Centigrade

In order to determine the quantity of LIOH.H$_2$O that is to be added to any given commercial (or pre-reacted) lithium silicate, the designation R$_2$O is used for Li$_2$O or the equivalent oxide in the composition (e.g., Li and Na in Lithsil-S). Then writing LiOH.H$_2$O as Li$_2$O.3H$_2$O, the R$_2$O:SiO$_2$ ratio can be calculated. Thus, if the R$_2$O content of the pre-reacted silicate of one starting material is lower than another, more of the lithium monohydrate is added to keep the total molar ratio R$_2$O:SiO$_2$ constant. In the preferred standard ink this ratio is 0.46.

Based upon the numerous tests performed upon the inks, the following compositional ranges of constituents are acceptable:

| 27.3-44.5 | wt% water |
| --- | --- |
| 55-65 | wt% pre-reacted lithium silicate solution (75-80% water) |
| 2.2-6.2 | wt% LiOH.H$_2$O |
| 0.5-1.5 | wt% suspension agent |
| 100% | liquid |
| 12-60 | wt% pigment (based upon liquid) |

The Li$_2$O:SiO$_2$ ratio for these satisfactory inks varies from about 0.34 to about 0.60. The overall water content in the ink liquid varies from about 82–86% due to the high water content of the commercial solutions.

A preferred ink has a composition:
36.9 wt % water
58.−4 wt % pre-reacted lithium silicate SiO$_2$:Li$_2$O molar ratio of 4.6
4.2 wt % LiOH.H$_2$O
0.5 wt % highly beneficiated Hectorite clay
20 wt % (based on liquid) TiO$_2$ or 50% MnO-Fe$_2$O$_3$ (88 wt %−12 wt %)

In certain applications, a thick paste-like marking ink (i.e., a flexogravure ink) is required. One such application for such an ink is in the marking of rubber inner tubes for tires. These tubes are marked when hot (about 240 degrees F.) and then water quenched prior to steam autoclaving. A flexogravure ink can be produced from the above-described inks by the addition of extra highly beneficiated hectorite clay, typically 2–5% based upon the total weight of the ink liquid plus pigment.

The above-described inks have a large proportion of water: up to 86 wt % when water and the lithium silicate solutions are added. Of course, when these inks (or coatings) are dried, the resultant marking contains only the lithia, silica, pigment and any of the residual clay. For example, an ink with a suitable range of Li$_2$O and SiO$_2$, and with 60 wt % pigment, results in a deposit of about 3.7 to 10.4 wt % (8.9 to 20.9 mol %) Li$_2$O, about 16.2 to 45 wt % SiO$_2$, with the remainder being the pigment (TiO$_2$ or MnO$_2$-Fe$_2$O$_3$). The melting points of these compositions range from 1,300–1,600 degrees C. (2,372–2,912 degrees F.).

For the preferred ink cited above, when the pigment is TiO$_2$ at 20 wt % of the ink liquid, the resultant deposit is expressed as 0.50Li$_2$O.1.07SiO$_2$.1.0 TiO$_2$ or 9.33 wt % Li$_2$O, 40.47 wt % SiO$_2$, 50.20 wt % TiO$_2$. The corresponding dark ink made using the MnO$_2$-Fe$_2$O$_3$ pigment at 50 wt % results in a deposit that can be expressed as 1.0 MnO$_2$.0.07Fe$_2$O$_3$.0.18Li$_2$O.0.40SiO$_2$. This deposit has 67.98 wt % MnO$_2$, 9.09 wt % Fe$_2$O$_3$, 4.29 wt % Li$_2$O and 18.63 wt % SiO$_2$. The ratio of SiO$_2$ to Li$_2$O in these deposits is about 4.34:1.

Although the above-described compositions involving a binder/suspension liquid plus an additive have been referred to as an ink, the same compositions can be used as coatings for substrates such as metals, ceramics, glass and graphite much as are paints. Thus, the present invention is not to be limited by the applications of the composition.

The foregoing describes specific applications of the binder/suspension composition of the present invention using pigments selected from oxides and oxide mixtures containing transition metals. The binder/suspension composition, however, can be used with a much wider range of additives, and with essentially any material that is compatible with the extremely basic nature of the present binder/suspension composition (about pH12).

For example, satisfactory coatings can be formulated using many refractory compounds as well as mixes of refractory compounds. In addition to the compositions based upon $TiO_2$ or $MnO_2$-$Fe_2O_3$ as specifically reported in the aforementioned parent patent application, good water-insoluble coatings have been produced with $Y_2O_3$ and ZnO. Also, many non-transition element additives produce excellent coatings. These include, for example, $Al_2O_3$, $SnO_2$, Kaolin, graphite, BN, $SiO_2$, nepheline syenite, MgO, PbO and mixtures of compatible materials. Compositions that have been evaluated are identified in Tables 5A, 5B and 5C. While the level of concentration of each of the additives to the binder/suspension varies for maximum covering quality and water insolubility, each additive has a level that will effect excellent results. Furthermore, an additive concentration can consist of a pigment (e.g., $TiO_2$) together with a filler such as Kaolin or other such materials. Thus, instead of a lower level of 12% (based on liquid weight) for $TiO_2$, only a few percent will be satisfactory due to the excellent "whitening" power of $TiO_2$.

TABLE 5A

| Identification | No. 1 | No. 2 | No. 3 | No. 4 | No. 5 | No. 6 | No. 7 |
|---|---|---|---|---|---|---|---|
| Wt % Liquid* | 65 | 41 | 75 | 61 | 54 | 67 | 67 |
| Wt % Additive | 35 | 59 | 25 | 39 | 46 | 33 | 33 |
|  | $Al_2O_3$ | $Al_2O_3$ | $SnO_2$ | $SnO_2$ | Kaolin | Graphite | BN |
| Wt % $Li_2O$** (a) | 4.0 | 1.8 | 5.8 | 3.5 | 2.8 | 4.3 | 4.3 |
| Wt % $SiO_2$** (a) | 17.6 | 7.6 | 25.1 | 15.4 | 12.1 | 18.9 | 18.9 |
| Wt % Other (a) | 78.0 | 90.6 | 69.1 | 81.1 | 85.1 | 76.8 | 76.8 |
|  | $Al_2O_3$ | $Al_2O_3$ | $SnO_2$ | $SnO_2$ | Kaolin | Graphite | BN |

*Liquid: 36 g $H_2O$; 58.4 g Lithsil #4; 4.2 g $LiOH.H_2O$; 1 g Sodium CMC
**From only liquid phase
(a) Percentage in dried coating
RESULTS:
No. 1 - Hard, adherent, good coating, water insoluble on drying
No. 2 - Hard, adherent, good coating, water insoluble on drying
No. 3 - Very hard, adherent, good coating, water insoluble on drying
No. 4 - Hard, OK coating, some tendency to flake or crack on drying, water insoluble on drying
No. 5 - Hard, good coating, water insoluble on drying
No. 6 - Soft, adherent, good smooth coating, water insoluble on drying
No. 7 - Soft, adherent, smooth coating, water insoluble on drying

TABLE 5B

| Identification | No. 8 | No. 9 | No. 10 | No. 11 | No. 12 | No. 13 |
|---|---|---|---|---|---|---|
| Wt % Liquid* | 41 | 30 | 58 | 64 | 65 | 75 |
| Wt % Additive | 59 | 70 | 42 | 36 | 35 | 25 |
|  | $SiO_2$ | (1) | MgO | PbO | $Y_2O_3$ | ZnO |
| Wt % $Li_2O$** (a) | 1.8 | 1.1 | 3.2 | 3.9 | 4.0 | 5.8 |
| Wt % $SiO_2$** (a) | 7.6 | 4.9 | 13.9 | 17.0 | 17.6 | 25.1 |
| Wt % Other (a) | 90.6 | 94.0 | 82.9 | 79.1 | 78.0 | 69.1 |
|  | $SiO_2$ | (1) | MgO | PbO | $Y_2O_3$ | ZnO |

*Liquid: 36 g $H_2O$; 58.4 g Lithsil #4; 4.2 g $LiOH.H_2O$; 1 g Sodium CMC
**From only liquid phase
(a) Percentage in dried coating
(1) Nepheline Syenite
RESULTS:
No. 8 - Soft, transparent-appearing coating, water insoluble on drying
No. 9 - OK coating, transparent-appearing, mostly water insoluble on drying [Bare water insolublity possibly from high level of powder loading].
No. 10 - Soft, chalky coating, washes off after drying [Possibly from water reaction/undercutting of the MgO]
No. 11 - Moderately hard coating, water insoluble on drying.
No. 12 - Moderately hard coating, water insoluble on drying.
No. 13 - Hard coating, water insoluble on drying.

TABLE 5C

| Identification | No. 14 | No. 15 | No. 16 | No. 17 | No. 18 |
|---|---|---|---|---|---|
| Wt % Liquid* | 33 | 55 | 38.5 | 33 | 39.5 |
| Wt % Additive | 67 | 45 | 61.5 | 67 | 60.5 |
|  | TiC | $Si_3N_4$ | Mo | $Ce_2S_3$ | $LaB_6$ |
| Wt % $Li_2O$** (a) | 1.3 | 2.9 | 1.6 | 1.3 | 1.65 |
| Wt % $SiO_2$** (a) | 5.6 | 12.5 | 6.9 | 5.6 | 7.2 |
| Wt % Other (a) | 93.1 | 84.6 | 91.5 | 93.1 | 91.1 |
|  | TiC | $Si_3N_4$ | Mo | $Ce_2S_3$ | $LaB_6$ |

*Liquid: 36 g $H_2O$; 58.4 g Lithsil #4; 4.2 g $LiOH.H_2O$; 1 g Sodium CMC.
**From only liquid phase.
(a) Percentage in dried coating.
RESULTS:
No. 14 - Hard, adherent, good coating, water insoluble on drying
No. 15 - Hard, adherent, good coating, water insoluble on drying
No. 16 - Moderately hard, good coating, water insoluble on drying
No. 17 - Moderately hard, rough coating (particle size a little too coarse leading to graniness), moderately water insoluble
No. 18 - Hard, rough coating from powder being a little too coarse, water insoluble on drying In addition to the previously described inks, a water-insoluble coating (after drying) is useful as a pre-coat or primer coat for various water-based coatings. There are many such water-based coatings that could be used on metals; however, they will not stick well on such substrates. Also, even if one coating should bond reasonably well, a second coating will dissolve the first. The water insolubility of the pre-coat prevents intermingling of the pre-coat with the top coat.

Another application of compositions based upon the present invention is the coating of metal "chute-tubes" used in the glass industry. Such applications would utilize BN, C or $SnO_2$ individually, or as a mixture as an additive to the binder/suspension composition.

In applications where low emissivity is desired, as in aerospace devices, $Al_2O_2$, ZnO or $Y_2O_3$ can be added to the binder/suspension composition. As in other applications, a coating can be applied at low temperatures, dried and then used at high temperatures.

Aluminum silicates can also be incorporated into the present binder/suspension composition. These silicates exist in many forms from clays to pure mullite ($3Al_2O_3$·$2SiO_2$).

The present binder/suspension composition is also useful as a "rigidizer" with fibrous materials or mixed with fibrous, flaky or other types of fillers. These include alumina-silica fibers, zirconia fibers, mica flakes, talc flakes, etc. It can also be used as a lay-up or build-up structure or for sealing surfaces so as to provide water insolubility at both normal or elevated temperatures. The binder/suspension compositions can be used alone or with very finely sized fillers to seal or impregnate plasma-sprayed surfaces by closing the open porosity in such surfaces with either a room-temperature or high-temperature cure.

From the foregoing, it will be recognized by persons versed in the art that a coating (or ink) has been developed that can be used at both room temperature or elevated temperature for applications on the above-identified substrates. The resultant deposit on the substrates has high adherence and good water insolubility. In the applications as a marking ink to identify metal ingots, sheets, etc., the composition is suitable at these extremes of temperature giving rise to markings via jet printers that can be machine or visually read.

Although a limited number of compositions have been identified, a range of compositions has been bracketed. It will be recognized that the invention is not to be limited by these tested compositions but is defined by the appended claims and their equivalents.

We claim:

1. A binder/suspension composition which comprises about 82 to about 86 wt % water and about to about 18 wt % $R_2O$ and $SiO_2$, where $R_2O$ is selected from $Li_2O$ and a mixture of $Li_2O$ and $Na_2O$, said $R_2O$ and $SiO_2$ having a molar ratio of about 0.34 to about 0.60, said $Li_2O$ of said $R_2O$ being present in about ⅓ to about ⅔ unreacted form relative to said $SiO_2$.

2. The composition of claim 1 further comprising a suspension agent in said liquid phase, said suspension agent present at about 0.5 wt % to about 5 wt % based upon said binder/suspension composition content, and selected from highly beneficiated clays and sodium carboxymethylcellulose.

3. The composition of claim 1 wherein said $R_2O$ is $Li_2O$, said $Li_2O$ derived from pre-reacted $Li_2O$-$SiO_2$ and from unreacted $LiOH.H_2O$.

4. The composition of claim 1 wherein said $R_2O$ is a mixture of $Li_2O$ and $Na_2O$, a portion of said $Li_2O$ derived from pre-reacted $Li_2O$-$Na_2$-$SiO_2$, and the remainder derived from unreacted $LiOH.H_2O$.

5. The composition of claim 3 wherein said pre-reacted $Li_2O$-$SiO_2$ has a molar ratio of $SiO_2$:$Li_2O$ of about 4.2:1 to about 6.3:1.

6. The composition of claim 1 further comprising about 6 to about 80 wt % of a finely divided refractory powder selected from graphite, oxides, borides, nitrides, carbides, sulfides, metals, and mixtures thereof, said refractory powder being substantially stable in said $R_2O$ and $SiO_2$.

7. The composition of claim 6 that, when dried, yields a constituency of about 1 to about 6% $Li_2O$, about 4 to about 99% $SiO_2$, with the remainder being said finely divided refractory powder.

8. A composition for application to a substrate to form a water insoluble and an adherent bond when dry, which comprises:

a liquid phase consisting essentially of about 82 to about 86 wt % water, and about 14 to about 18 wt % $R_2O$ and $SiO_2$, where $R_2O$ is selected from $Li_2O$ and a mixture of $Li_2O$ and $Na_2O$, said $R_2O$ and $SiO_2$ having a molar ratio of about 0.34 to about 0.60, said $Li_2O$ of said $R_2O$ being present in about ⅓ to about ⅔ unreacted form relative to said $SiO_2$; and an additive of about 6 to about 80 wt % based upon said liquid phase, said additive selected from a finely divided refractory powder of graphite, oxides, borides, nitrides, carbides, sulfides, metals, and mixtures thereof, said refractory powder being stable in said liquid phase.

9. The composition of claim 8 wherein said unreacted form of $Li_2O$ is derived from $LiOH.H_2O$, and further comprising a suspension agent present at about 0.5 wt % to about 1.5 wt % based upon said liquid phase content, said suspension agent selected from highly beneficiated clays and sodium carboxymethylcellulose.

10. The composition of claim 8 that, when dried, yields a constituency of about 1 to about 6% $Li_2O$, about 4 to about 99% $SiO_2$, with the remainder being said finely divided refractory powder.

11. A method of preparing a binder/suspension which comprises preparing a liquid phase by mixing about 27 wt % to about 45 wt % water, about 55 wt % to about 65 wt % pre-reacted $Li_2O$-$SiO_2$ solution having about 75–80% water content and a $SiO_2$:$Li_2O$ molar ratio of about 4.2:1 to about 6.3:1, and about 2.3 wt % to about 6.2 wt % unreacted $LiOH.H_2O$.

12. The method of claim 11 further comprising adding about 0.5 wt % to about 1.5 wt % of a suspension agent selected from highly beneficiated suspension clay and sodium carboxymethylcellulose to said liquid phase.

13. The method of claim 11 wherein said water is about 36.9 wt %, said pre-reacted $Li_2O$-$SiO_2$ solution is 58.4 wt % and has a $SiO_2$:$Li_2O$ molar ratio of abut 4.6:1, and said unreacted $LiOH.H_2O$ is about 4.2 wt %.

14. The method of claim 12 further comprising the step of adding to said liquid phase and said suspension agent a finely-divided refractory powder selected from graphite, oxides, borides, nitrides, carbides, sulfides, metals, and mixtures thereof, said refractory powder being stable in said liquid phase.

* * * * *